United States Patent [19]
Yuyama

[11] Patent Number: 5,722,215
[45] Date of Patent: Mar. 3, 1998

[54] SEALING DEVICE

[76] Inventor: Shoji Yuyama, 3-8, Honan-cho Nishi 4-chome, Toyonaka-shi, Osaka, Japan

[21] Appl. No.: 609,831

[22] Filed: Mar. 1, 1996

[30] Foreign Application Priority Data

Mar. 2, 1995 [JP] Japan ................... 7-043168

[51] Int. Cl.$^6$ ................................. B65B 9/06
[52] U.S. Cl. .............. 53/374.4; 53/75; 53/550; 53/562; 156/465
[58] Field of Search .............. 53/66, 75, 374.2, 53/374.3, 374.4, 375.4, 376.2, 548, 550, 551, 552, 553, 554, 555, 562, 568; 156/324, 379.9, 380.1, 465, 466

[56] References Cited

U.S. PATENT DOCUMENTS

| | | | |
|---|---|---|---|
| 2,208,951 | 7/1940 | Tamassy | 53/554 X |
| 2,248,471 | 7/1941 | Stroop | 53/552 X |
| 2,348,201 | 5/1944 | Barnett | 53/552 X |
| 2,626,494 | 1/1953 | Lewis | 53/554 |
| 2,889,671 | 6/1959 | Weisman | 53/554 X |
| 2,994,996 | 8/1961 | Klar | 53/562 X |
| 3,074,214 | 1/1963 | Schneider et al. | 53/552 |
| 3,439,469 | 4/1969 | Van Mil | 53/554 X |
| 3,546,849 | 12/1970 | Zimmerman | 53/550 X |
| 3,838,552 | 10/1974 | Hooley et al. | 53/550 |
| 3,850,780 | 11/1974 | Crawford et al. | 53/550 X |

*Primary Examiner*—Daniel Moon
*Attorney, Agent, or Firm*—Wenderoth, Lind & Ponack

[57] ABSTRACT

A sealing device which can form pouches with different widths, which is small in size, and which can minimize the waste of sheet material. To reduce the size of the device, a pair of second rotary shafts each carrying a longitudinal heating member having a cylindrical heating surface for feeding a two-folded packing sheet and sealing its side edges by coming into contact with the sheet are mounted on a pair of rotary shafts provided in the feed path of the sheet and each carrying a lateral heating member having an axial heating surface adapted to laterally contact the sheet and a surface not in contact with the sheet. To form a pouch from the sheet, the first rotary shafts are rotated by a first rotary drive unit to laterally seal the sheet by pressing the lateral heating members. Then, the side edges of the sheet are sealed by rotating the longitudinal heating members by rotating the second rotary shafts with a second rotary drive unit. By adjusting the feed distance of the sheet, it is possible to form pouches with different widths. With this arrangement, it is possible to form any narrow pouches. Thus, it is possible to minimize the waste of sheet material.

2 Claims, 9 Drawing Sheets

SEALING DEVICE

BACKGROUND OF THE INVENTION

This invention relates to a sealing device for a heat-fusible packing sheet for packing drugs.

Drugs prepared by a drug packing device is packed in pouches formed from a heat-fusible packing sheet.

Such a heat fusible sheet is folded in two and fed along a feed path in which is provided a sealing device. Drugs are dropped into the folded sheet at the inlet end of the sealing device. After dropping drugs into the sheet, the sheet is fed a predetermined distance. While being fed, three sides of the sheet are heat-sealed by the sealing device to form a pouch in which are packed the drugs. By repeating this operation, drugs are packed in a plurality of pouches formed from the packing sheet.

FIG. 9 shows a conventional sealing device of this type. It comprises a pair of heating members 2 provided in the feed path of a packing sheet 1 which has been longitudinally folded in two. Each heating member 2 comprises a head having a cylindrical heating surface and a shaft having an axial heating surface. By turning the heating members 2 in opposite directions as shown in FIG. 10, the sheet 1 is fed and at the same time sealed along their longitudinal edges by the cylindrical heating surfaces and along transverse lines by the axial heating surfaces. In the figure, numeral 9 indicates guide rollers.

In this arrangement, every time the heating members 2 are rotated twice, two transverse seal lines and a longitudinal seal line are formed by the axial heating surfaces and the cylindrical heating surfaces, so that one pouch is formed. The pouches thus formed are all of the same width. Namely, it is impossible to form pouches with different widths.

FIG. 11 shows a sealing device which can form pouches with different widths. It comprises a pair of lateral heating members 3 for sealing the sheet 1 along transverse lines, and a pair of longitudinal heating members 4 provided at the downstream end of the heating members 3 for sealing the longitudinal edges of the sheet 1. Each lateral heating member 3 has, as shown in FIG. 12, a axial heating surface 5 adapted to be brought into contact with the sheet 1 and a non-contact surface 6 that is kept out of contact with the sheet 1. The heating member 4 has cylindrical heating surfaces 7 that are always kept in contact with both sides of the sheet 1. The lateral heating members 3 and the longitudinal heating members 4 are coupled to mutually independent driving motors (not shown) through separate gear units 8 so that they can be driven independently of each other. To pack drugs, the lateral heating members 3 are rotated by the corresponding motor until their axial heating surfaces 5 face each other to seal the sheet along a transverse line. Then, after turning the lateral heating members until the non-contact surfaces 6 face each other, the longitudinal heating members 4 are rotated to seal the longitudinal edges of the sheet 1 while feeding the sheet longitudinally with the cylindrical heating surfaces 7. The width of the pouch formed can be varied by adjusting the distance by which the sheet is fed by the longitudinal heating members 4. After feeding the sheet by a desired distance, the lateral heating members 3 are turned again until the heating surfaces 5 face each other to seal the sheet along a second transverse line. A pouch is thus formed.

In this arrangement, although it is possible to form pouches with different widths, the sheet has to be fed a longer distance to form one pouch than with the prior device comprising only a pair of heating members. The sealing device is thus rather large in size, and so is the entire drug packing apparatus.

In order to mark the boundary between a series of drug pouches for one patient and a subsequent series of drug pouches for another patient, a few blank pouches containing no drugs are formed between these two series of pouches. Such blank pouches should be as narrow as possible to save the sheet material and the operation time. But in this conventional arrangement, since the longitudinal heating members are provided downstream of the lateral heating members, it is impossible to form sufficiently narrow blank pouches.

Namely, as will be apparent from FIG. 11, it is impossible to form a blank sheet narrower than the distance between the lateral heating members 3 and the longitudinal heating members 4. Thus, the blank pouches marking the boundaries between the pouches for two patients are unnecessarily wide. In an actual operation, numerous such blank pouches have to be formed because the number of such boundaries are equal to the number of patients. Thus, the waste of sheet material resulting from unnecessarily wide blank pouches is unignorable.

An object of this invention is to provide a sealing device which can change the width of pouches according to the amount of drugs to be supplied into each pouch, which is compact in size, and which can minimize the waste of sheet material.

SUMMARY OF THE INVENTION

According to this invention, there is provided a sealing device comprising a pair of first rotary shafts provided in a feed path for a double-folded, heat-fusible packing sheet and rotatably supported by bearings so as to extend perpendicular to the direction in which the packing sheet is fed, a pair of lateral heating means mounted on the respective first rotary shafts and each having an axially extending heating surface capable of contacting the sheet and a surface kept out of contact with the sheet, a pair of second rotary shafts rotatably mounted around the respective first rotary shafts through bearings, a pair of longitudinal heating members mounted on the respective second rotary shafts and each having a cylindrical heating surface adapted to contact both side edges of the sheet, a first rotary drive means for rotating the first rotary shafts, and a second rotary drive means for rotating the second rotary shafts.

In the second invention, the first rotary shafts have the longitudinal heating members instead of the lateral heating members, while the second rotary shafts carry the lateral heating members instead of the longitudinal heating members.

In the first invention, the rotary shafts are provide perpendicular to the direction in which the packing sheet is fed. By rotating the first rotary shafts with the first rotary drive means, the lateral heating members mounted on the respective first rotary shafts abut and laterally heat-seal the packing sheet.

Since the second rotary shafts are rotatably mounted around the first rotary shafts through bearings, they can be rotated independently of the first rotary shafts by the second rotary drive means. By actuating the second rotary drive means, the sheet is heat-sealed along its side edges by being pressed by the cylindrical heating surfaces of the longitudinal heating members mounted on the respective second rotary shafts.

Since the second rotary shafts are mounted around the portions of the first rotary shafts not provided with the lateral heating members, they will never hinder the sealing operation of the lateral heating members.

To form a pouch, the first rotary shafts are rotated by the first rotary drive means until the axial heating surfaces of the lateral heating members face each other. The sheet is thus laterally heat-sealed. The rotary shafts are then rotated until the non-contact surfaces face each other. The sheet is not in contact with both lateral heating members in this state. Then, the longitudinal heating members are rotated by rotating the second rotary shafts with the second rotary drive means to heat-seal the sheet along its side edges. By varying the distance by which the sheet is fed by the longitudinal heating members, it is possible to adjust the width of the pouch.

When both side edges have been sealed, the first rotary shafts are rotated until the axial heating surfaces of the lateral heating members face each other to laterally seal the sheet. A pouch is thus formed.

In the second invention, the first rotary shafts have the longitudinal heating members, while the second rotary shafts have the lateral heating members. Thus, to seal the sheet along its side edges, the longitudinal heating members are rotated by rotating the first rotary shafts with the first rotary drive means. To laterally seal the sheet, the lateral heating members are rotated by rotating the second rotary shafts with the second rotary drive means.

Other features and objects of the present invention will become apparent from the following description made with reference to the accompanying drawings, in which:

DETAILED DESCRIPTION OF THE PREFERRED EMBODIMENT

Embodiments of this invention are described with reference to the drawings.

Figure 1:
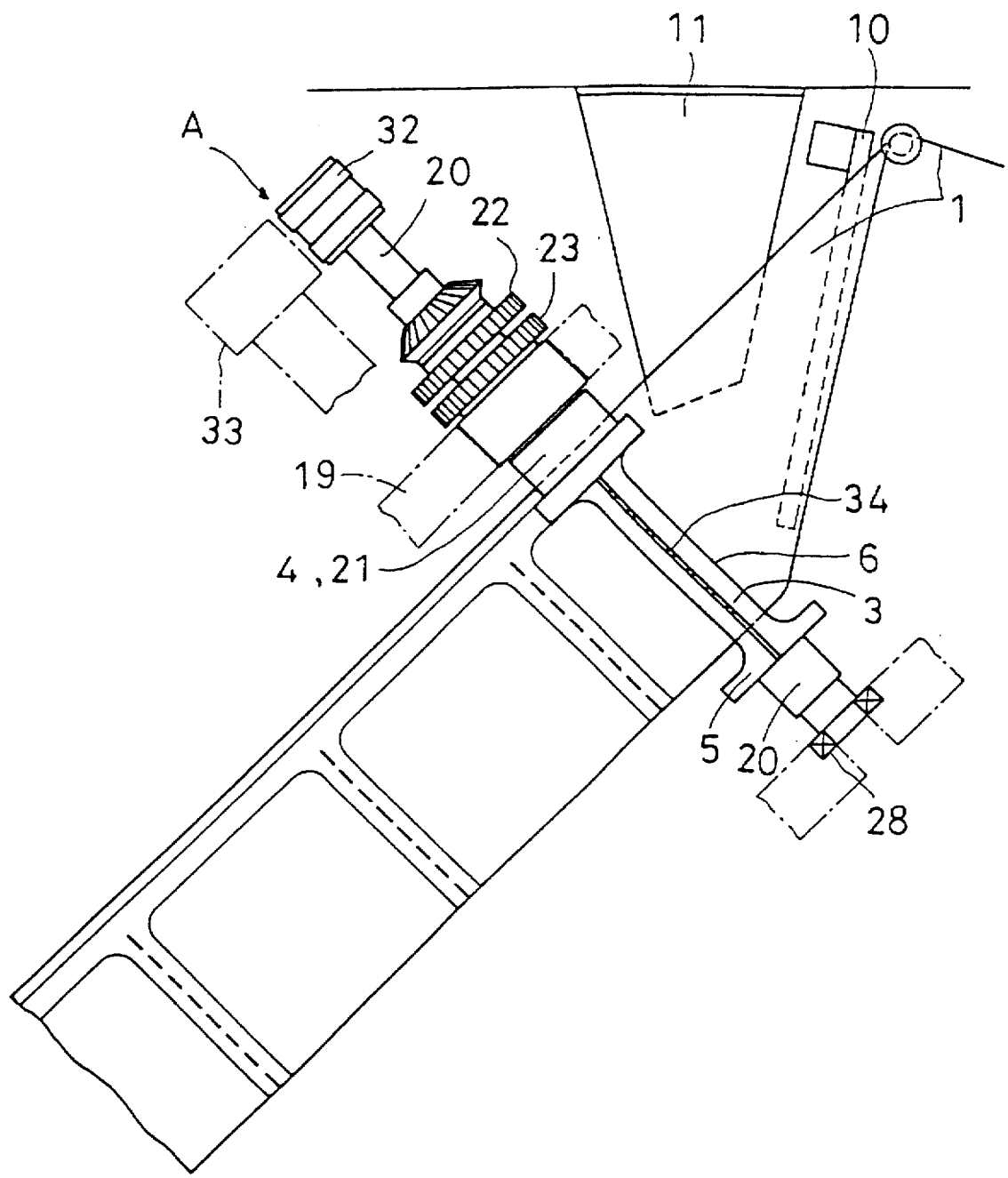
FIG. 1 is a front view in vertical section of a first embodiment.

FIG. 1 shows a sealing device A of the first embodiment. It is provided along the feed path for a heat-fusible packing sheet 1 of the drug packing apparatus.

Also provided along this feed path is a triangular folder 10 for longitudinally folding the sheet in two.

Downstream of the folder 10, a chute 11 is provided through which predetermined amounts of drugs are dropped into the double-folded sheet 1. The sealing device A is provided downstream of the chute 11.

Figure 2:
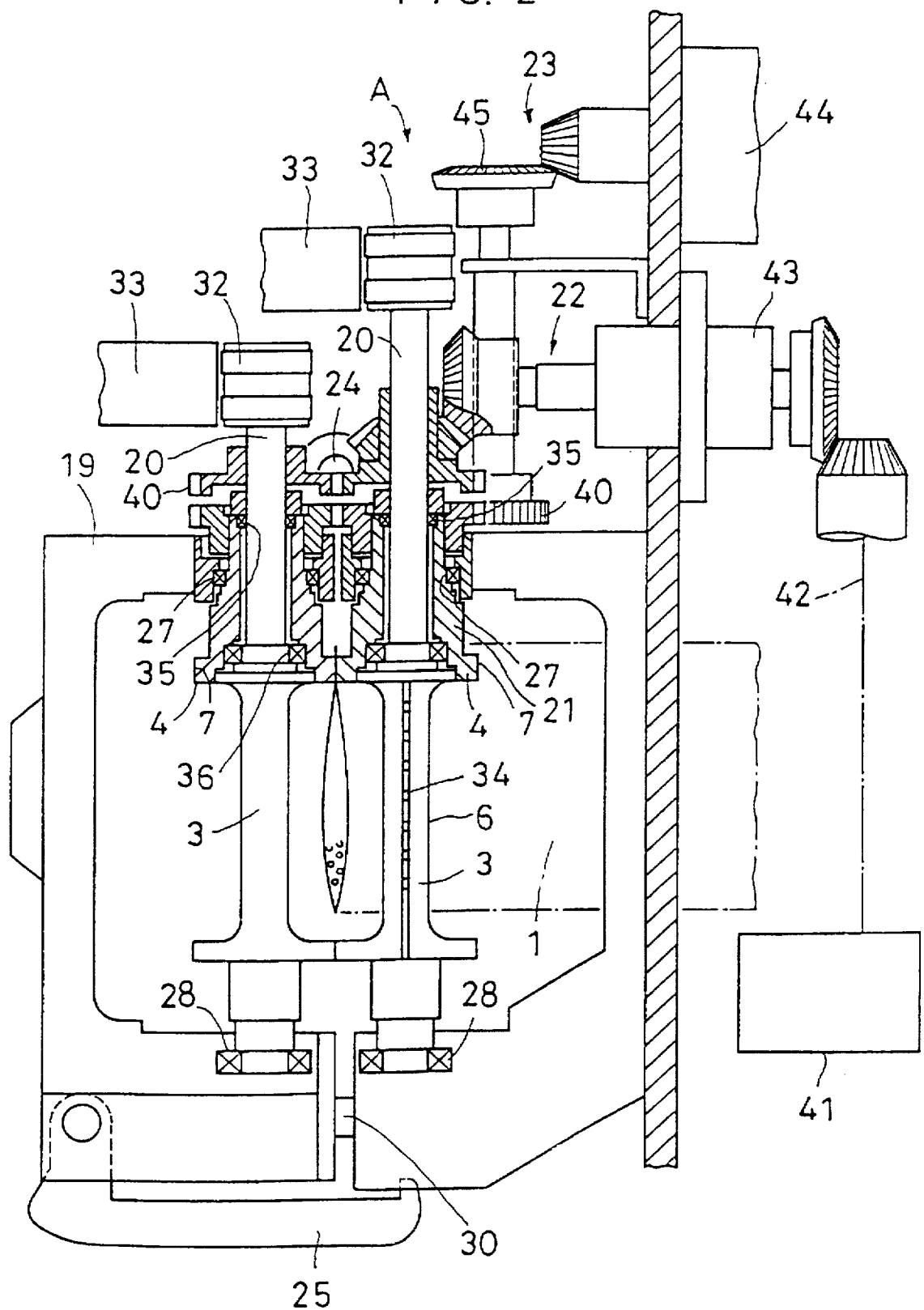
FIG. 2 is a side view in vertical section of the first embodiment.

Referring to FIG. 2, the sealing device A comprises a pair of first rotary shafts 20 rotatably mounted on a bearing block 19 provided along the feed path for the packing sheet. Each rotary shaft 20 carries a lateral heating member 3. A second rotary shaft 21 is rotatably mounted around each first rotary shaft 20 and carries a longitudinal heating member 4. The first rotary shafts 20 and the second rotary shafts 21 are rotated independently of each other by a first driving mechanism 22 and a second driving mechanism 23, respectively.

As shown in FIG. 2, the bearing block 19 has a hinge 24 at its top and an engaging claw 25 at its bottom. It is opened and closed by controlling the claw 25. The first rotary shafts 20 and the second rotary shafts 21 are supported by first bearings 27 set in a mounting hole formed in the top end of the bearing block 19. Further, the first rotary shafts 20 are supported at their bottom ends by second bearings 28 received in bearing holes formed in the bottom end of the bearing block 19. The bearing block 19 comprises two separate portions. While in use, they are coupled together by means of a pin 30.

Figure 3:
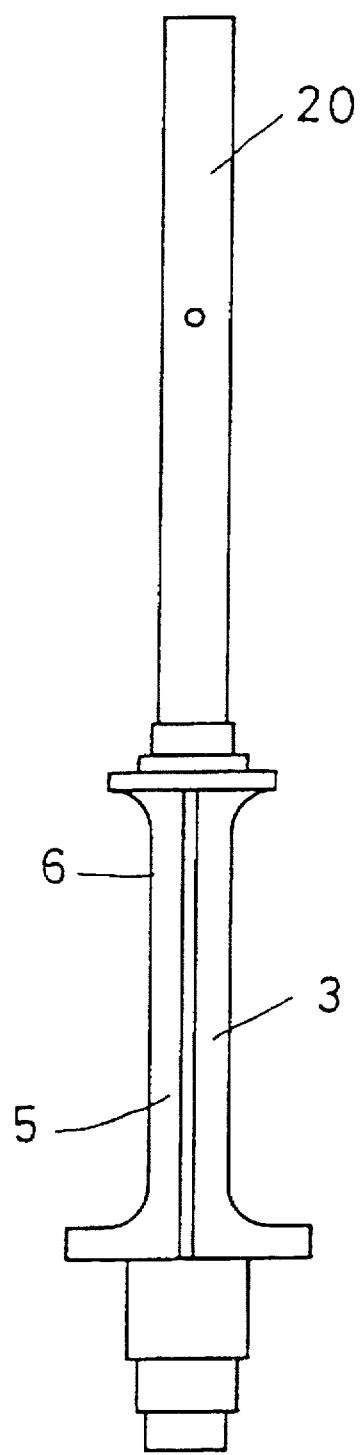
FIG. 3 is a front view of a lateral heating member of the first embodiment.

Now referring to FIG. 3, each first rotary shaft 20 carries the lateral heating member 3, which is actually an integral mid-portion of the shaft 20. The heating member 3 is hollow and carries a heater (not shown) in the hollow. As shown in FIG. 3, each heater is connected to a trolley electrode 32 abutting a feeder brush 33.

Figure 5:
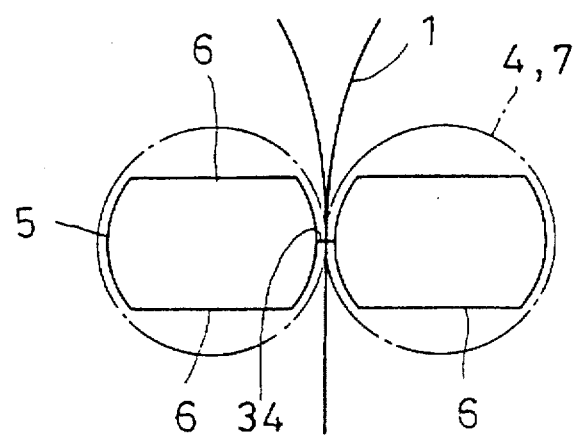
FIGS. 5 and 6 are views showing the operation of the sealing device of the first embodiment.

As shown in FIG. 5, each lateral heating member 3 has diametrically opposite axially extending arcuate heating surfaces 5 adapted to be brought into contact with the packing sheet 1. Flat non-contact surfaces 6 are formed on both sides of the heating surfaces 5. They are kept out of contact with the packing sheet 1. Perforating blades 34 are arranged axially on the axial heating surfaces 5 to form perforations in the packing sheet 1 when laterally heat-sealing the sheet.

Figure 4:
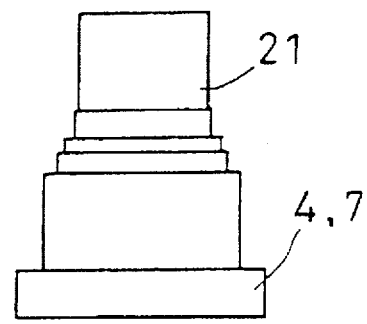
FIG. 4 is a front view of a longitudinal heating member of the first embodiment.

Referring to FIG. 4, each second rotary shaft 21 has a shoulder portion to be supported by the bearing and a flange as the longitudinal heating member 4 having a cylindrical heating surface 7. It has a bore through which the first rotary shaft 20 extends. The bore has shoulders for supporting a third and a fourth bearing 35 and 36 (FIG. 2). Each second rotary shaft 21 is rotatably mounted around the upper portion of the first rotary shaft 20 through the third and fourth bearings 35 and 36. Namely, it is located over the lateral heating member 3.

The longitudinal heating members 4 have an inner diameter slightly larger than the maximum distance between the heating surfaces 5 of each lateral heating member 3 to keep the perforating blades 34 out of contact with the inner periphery of the longitudinal heating members 4 while heat-sealing the sheet with the lateral heating members 3. With this arrangement, since no undue force is applied to the cylindrical heating surfaces 7, it is possible to uniformly seal the sheet.

The first rotary shafts 20, received in the second rotary shafts 21, are inserted in the mounting hole formed in the bearing block 19. The first bearings 27 support the second rotary shaft 21 by engaging a shoulder portion formed on the outer periphery thereof. The bottom ends of the first rotary shafts 20 are received in the bearing holes formed in the bearing block 19 and rotatably supported by the second bearings 28 mounted in the bearing holes. Thus, the first rotary shafts 20 carrying the lateral heating members 3 and the second rotary shafts 21 mounted around the first rotary shafts 20 can be rotated independently of each other.

Also, as shown in FIG. 2, the lateral heating members 3 and the longitudinal heating members 4, provided on the first rotary shafts 20 and the second rotary shafts 21, respectively, are driven independently of each other by first rotary drive mechanism 22 and the second rotary drive mechanism 23, respectively.

The first rotary drive mechanism 22 comprises a spur gear train 40 coupled to the first rotary shafts 20, a motor 41 and a transmission for transmitting the driving force of the motor 41 to the gear train 40. More specifically, the rotation of the rotary shaft of the motor 41 is transmitted to a first transmission shaft 42 extending perpendicular to the motor rotary shaft and then to a second transmission shaft 43 extending perpendicular to the first transmission shaft 42. From the second transmission shaft 43, the driving force is delivered through the spur gear train 40 to the pair of first rotary shafts 20 to rotate them in opposite directions to each other. The shafts 20 have to be positioned so that the axial heating surfaces 5 of the respective lateral heating members 3 face each other as the shafts 20 are rotated. The first transmission shaft 42 carries a position sensor for detecting the angular positions of the lateral heating members 3.

Similarly, the driving mechanism 23 for the second rotary shafts 21 comprises a spur gear train 40 fitted on the second rotary shafts 21, a motor 44 and a transmission for transmitting the driving force of the motor 44 to the gear train 40. More specifically, the rotation of the rotary shaft of the motor 41 is transmitted through a third transmission shaft 45 extending perpendicular to the motor rotary shaft and the spur gear train 40 to the pair of second rotary shafts 21 to rotate them in opposite direction to each other.

The motors 41 and 44 and the position sensor are connected to a control unit of the drug packing apparatus so that they are controlled synchronized with the drug packing apparatus.

Figure 6:
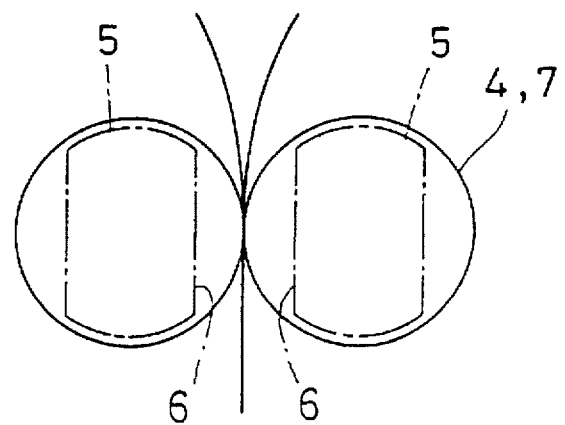

In operation, with a folded packing sheet 1 set in the feed path, the control unit energizes the heaters in the first rotary shafts 20 to heat the first rotary shafts 20. When the lateral heating members 3 and the longitudinal heating members 4 are heated by the heaters to a predetermined temperature, the motor 41 is activated to rotate the first rotary shafts until two of the axial heating surfaces 5 of the respective lateral heating members 3 face each other as shown in FIG. 5. After laterally heat-sealing the sheet, the first rotary shafts are rotated to bring two of the non-contact surfaces 6 in opposition to each other as shown in FIG. 6. At the same time, the motor 44 for the second rotary shafts is activated to heat-seal the side edges of the sheet 1 together while feeding the sheet 1 by pressing the cylindrical heating surfaces 7.

While heat-sealing the side edges of the sheet, a predetermined batch of drugs are supplied from a chute 11 into the pouch of the sheet formed by heat-sealing the two sides of the folded sheet. The width of this pouch is determined by the feed distance of the sheet 1 which is in turn determined by e.g. the feed speed. Thus, by adjusting the feed speed of the sheet, it is possible to form pouches with different widths according to the amounts of drugs supplied. When the sheet is fed a predetermined distance, the motor 41 is activated again to turn the lateral heating members 3 until their axial heating surfaces 5 face each other as shown in FIG. 5. Thus, the remaining open side of the pouch is closed. Namely, the drugs are sealed in the pouch. With this arrangement, it is possible to seal the sheet laterally simultaneously when sealing its side edges. Thus, it is possible to continuously pack drugs in a plurality of pouches.

Since it is possible to simultaneously seal the heat laterally and longitudinally, it is possible to form any narrow pouch. Thus, it is possible to form sufficiently narrow pouches as the abovementioned blank pouches used to mark the boundary between two series of pouches for two different patients.

Since both the lateral heating members 3 and the longitudinal heating members 4 are mounted on the first rotary shafts 20, it is possible to shorten the feed path for the packing sheet. Also, it is possible to reduce the waste of sheet material by forming sufficiently narrow blank pouches.

Figure 7:
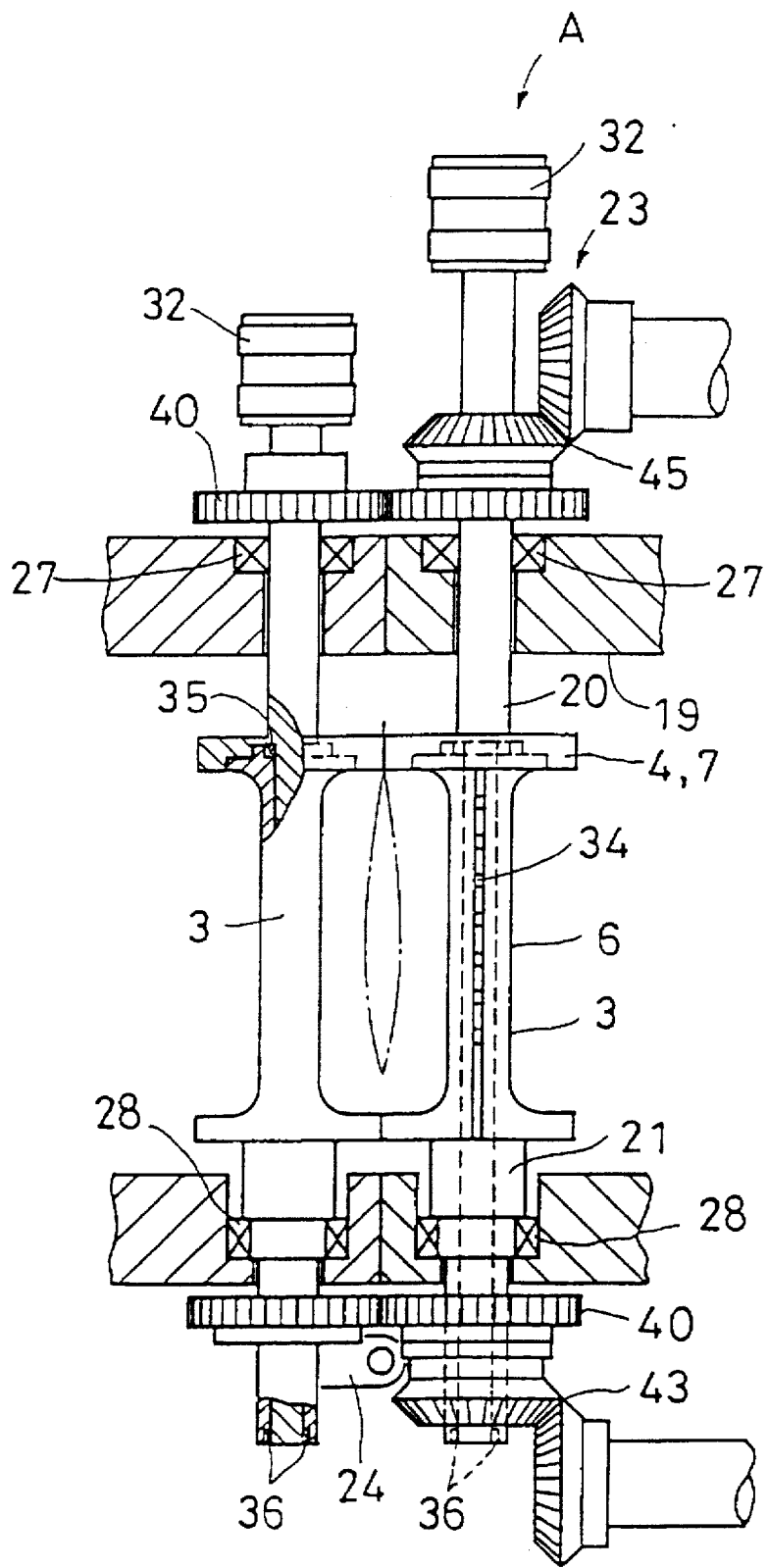
FIG. 7 is a partial side view in vertical section of a second embodiment.

FIG. 7 shows a sealing device A of the second embodiment.

In this embodiment, the first rotary shafts 20 have the longitudinal heating members 4 instead of the lateral heating members 3, while the second rotary shafts 21 carry the lateral heating members 3 instead of the longitudinal heating members 4.

Figure 8:
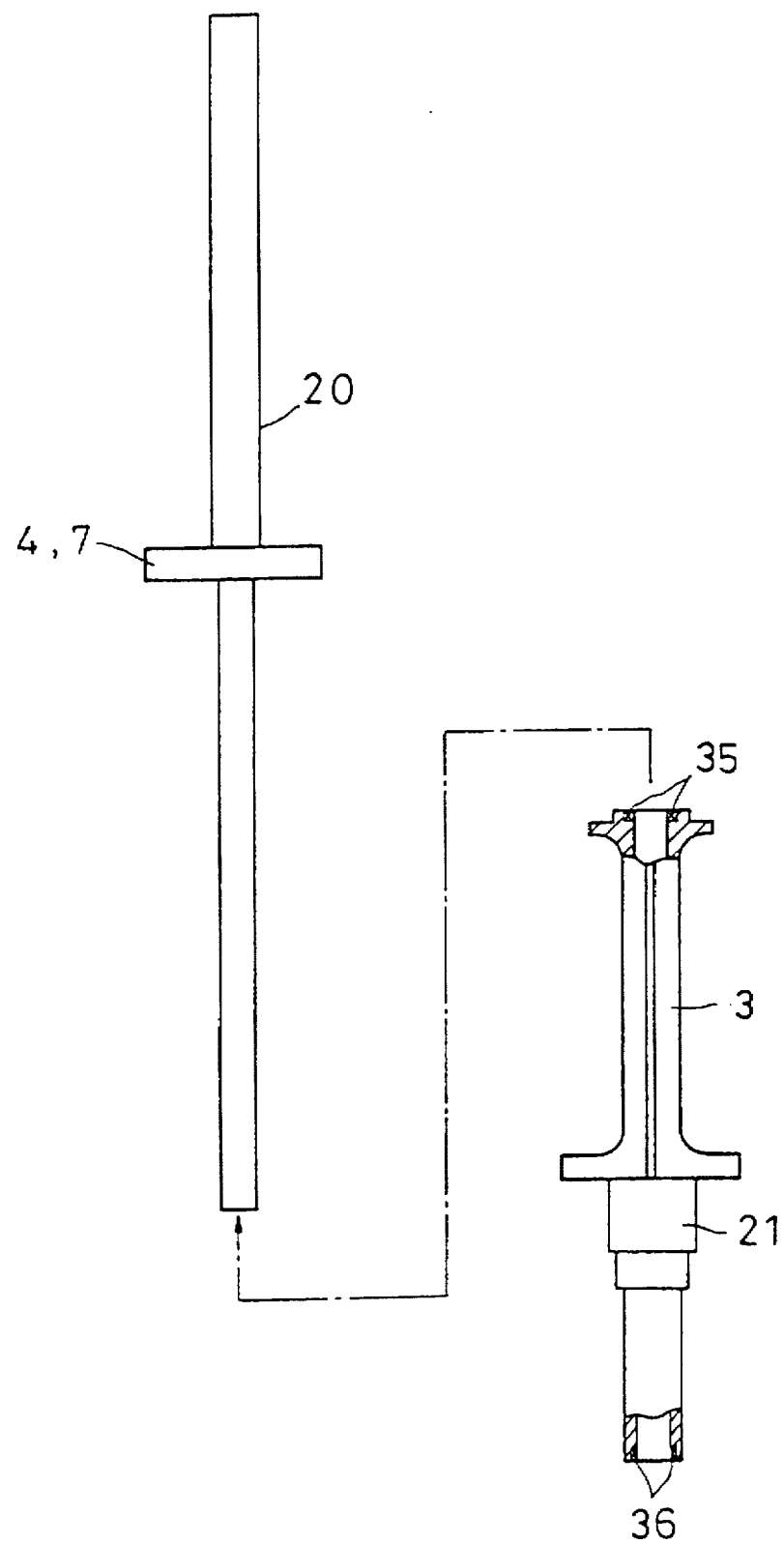
FIG. 8 is a partially cutaway exploded front view of a longitudinal heating member and a lateral heating member of the second embodiment.
Figure 9:
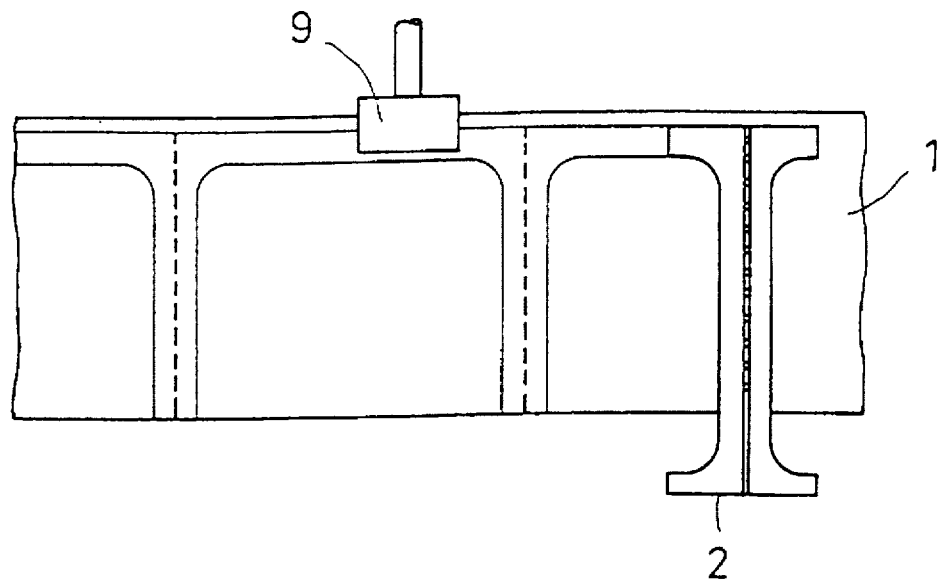
FIG. 9 is a schematic view of a conventional sealing device.
Figure 10:
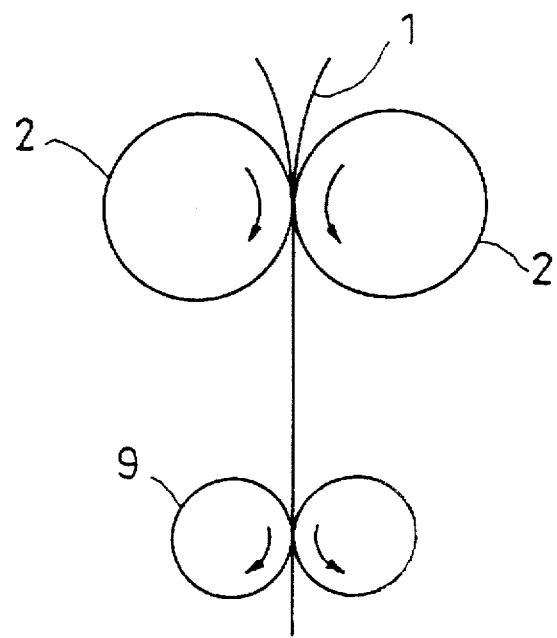
FIG. 10 is a view showing the operation of the conventional device.
Figure 11:
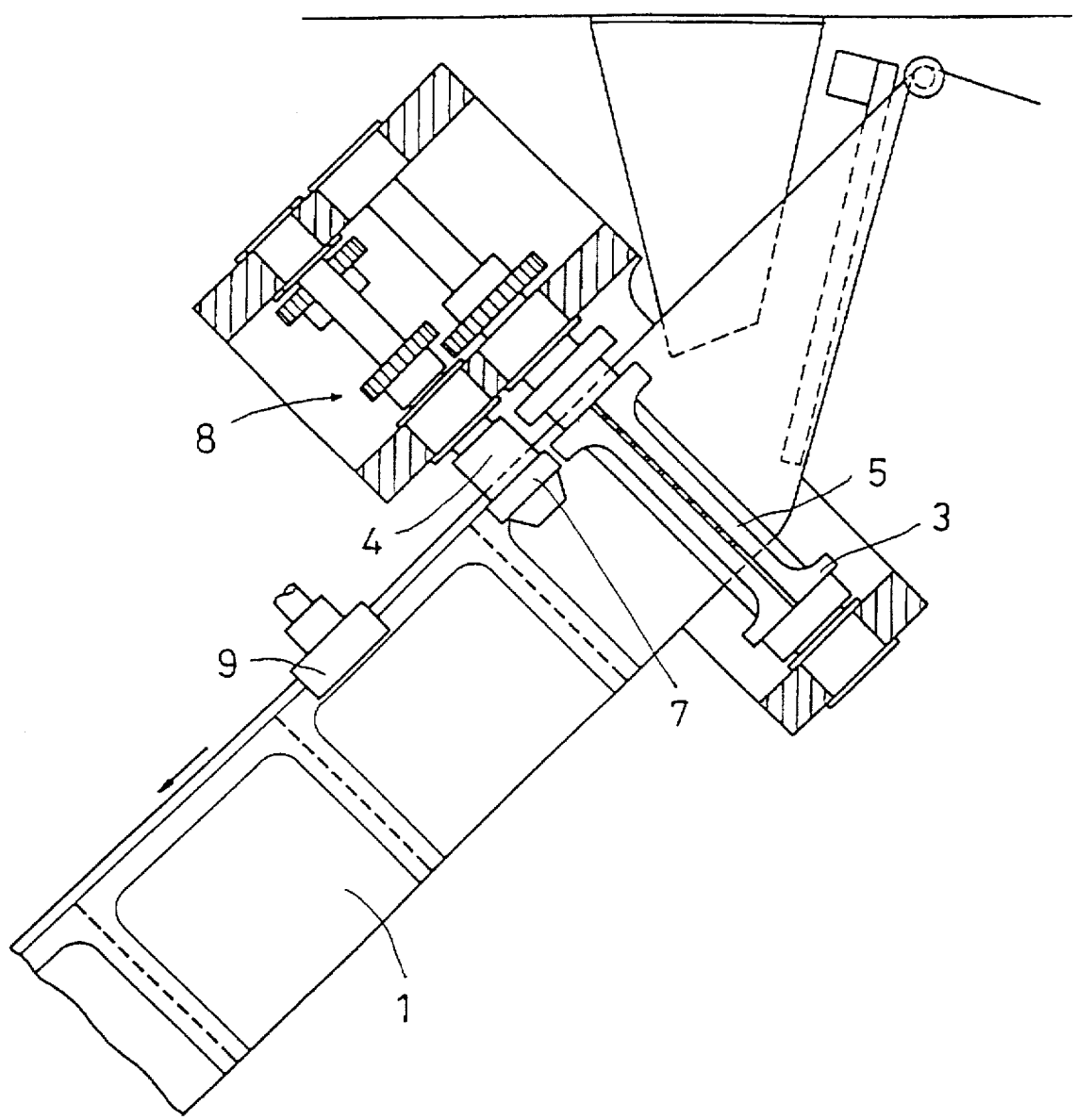
FIG. 11 is a vertical sectional front view of another conventional sealing device.
Figure 12:
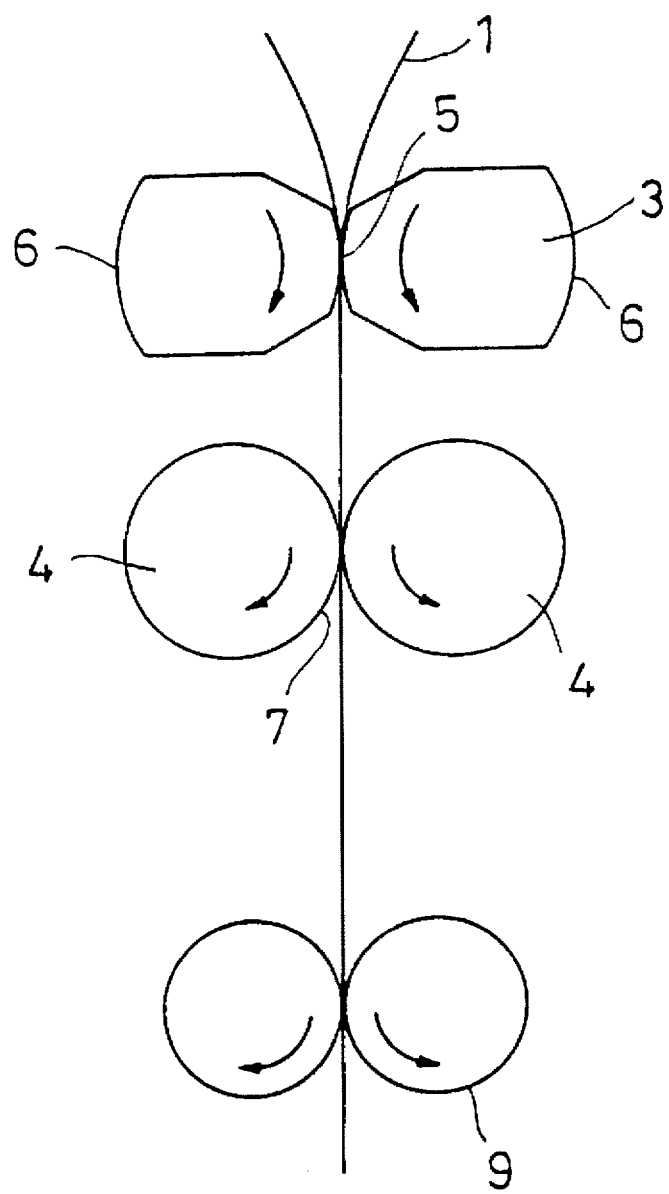
FIG. 12 is a view showing its operation.

As shown in FIG. 8, the first rotary shaft 20 carrying the longitudinal heating member 4 is inserted through a bore formed in the second rotary shaft 21 carrying the lateral heating member 3. The first rotary shaft 20 is hollow and carries a heater (not shown) in the hollow.

A third bearing 35 and a fourth bearing 36 are fitted in the bore of each second rotary shaft 21 at both ends thereof to rotatably support the first rotary shaft 20.

Referring to FIG. 7, the first and second rotary shafts 20 and 21 are received in mounting holes formed in the top and bottom of the bearing block 19, and are rotatably supported by the first and second bearings 27 and 28.

In this embodiment, the first rotary drive mechanism 22 for rotating the first rotary shafts 20 has bevel gears mounted on the first rotary shafts 20 at their portions protruding from the top mounting holes of the bearing block 19. Turning force is transmitted to the bevel gears through a first transmission shaft 22 extending perpendicular to the bevel gears to rotate the first rotary shafts 20. Similarly, the second rotary drive mechanism 23 for rotating the second rotary shafts 21 has bevel gears mounted on the second rotary shafts 21 at their portions protruding from the bottom mounting holes. Turning force is transmitted to the bevel gears through a third transmission shaft 45 to rotate the second rotary shafts 21.

The device of this embodiment is simpler in structure than the first embodiment, in which the first and second rotary drive mechanism 22 and 23 are provided on the same side of the rotary shafts. Thus, it can be manufactured at a low cost. The possibility of trouble is small too.

This embodiment is otherwise the same as the first embodiment in its structure and function, and the same effects will be achieved. Thus, no more detailed description of this embodiment is deemed necessary. Like numerals in both embodiments denote like elements.

With this arrangement, it is possible to shorten the feed path for the packing sheet and thus to reduce the size of the entire device. It is possible to reduce the width of blank pouches used to mark the boundary between two series of pouches for two patients and thus to minimize the waste of sheet material.

What is claimed is:

1. A sealing device comprising a pair of first rotary shafts provided in a feed path for a longitudinally two-folded, heat-fusible packing sheet and rotatably supported by bearings so as to extend perpendicular to the direction in which said packing sheet is fed, a pair of lateral heating members mounted on said respective first rotary shafts and each having an axially extending heating surface capable of contacting said sheet and a surface kept out of contact with said sheet, a pair of second rotary shafts rotatably mounted around said respective first rotary shafts through bearings, a pair of longitudinal heating members mounted on said respective second rotary shafts and each having a cylindrical heating surface adapted to contact both side edges of said sheet, a first rotary drive means for rotating said first rotary shafts, and a second rotary drive means for rotating said second rotary shafts.

2. A sealing device comprising a pair of first rotary shafts provided in a feed path for a two-folded, heat-fusible packing sheet and rotatably supported by bearings so as to extend perpendicular to the direction in which said packing sheet is fed, a pair of longitudinal heating members mounted on said respective first rotary shafts and each having a cylindrical heating surface adapted to contact both side edges of said sheet, a pair of second rotary shafts rotatably mounted around said respective first rotary shafts through bearings, a pair of lateral heating means mounted on said respective second rotary shafts and each having an axially extending heating surface capable of contacting said sheet and a surface kept out of contact with said sheet, a first rotary drive means for rotating said first rotary shafts, and a second rotary drive means for rotating said second rotary shafts.

* * * * *